United States Patent [19]
Barak

[11] 3,982,526
[45] Sept. 28, 1976

[54] TURNING COLLECTORS FOR SOLAR RADIATION

[75] Inventor: Amitzur Z. Barak, Chicago, Ill.

[73] Assignee: The United States of America as represented by the United States Energy Research and Development Administration, Washington, D.C.

[22] Filed: May 20, 1975

[21] Appl. No.: 579,179

[52] U.S. Cl. .................................. 126/270; 60/641
[51] Int. Cl.[2] ............................................. F24J 3/02
[58] Field of Search .............. 126/270, 271; 60/641; 237/1 A; 136/89

[56] References Cited
UNITED STATES PATENTS
| | | | |
|---|---|---|---|
| 1,951,404 | 3/1934 | Goddard | 126/270 |
| 3,213,284 | 10/1965 | Lord | 60/641 |

OTHER PUBLICATIONS
June, 1971, "Passive Solar Array Orientation Devices for Terrestrial Application", Fairbank and Morse, pp. 67–79.

Primary Examiner—Kenneth W. Sprague
Assistant Examiner—James C. Yeung
Attorney, Agent, or Firm—Dean E. Carlson; Arthur A. Churm; Paul A. Gottlieb

[57] ABSTRACT

A device is provided for turning a solar collector about the polar axis so that the collector is directed toward the sun as the sun tracks the sky each day. It includes two heat-expansive elements and a shadow plate. In the morning a first expansive element is heated, expands to turn the collector to face the sun, while the second expansive element is shaded by the plate. In the afternoon the second element is heated, expands to turn the collector to face the sun, while the first is shaded by the plate.

12 Claims, 11 Drawing Figures

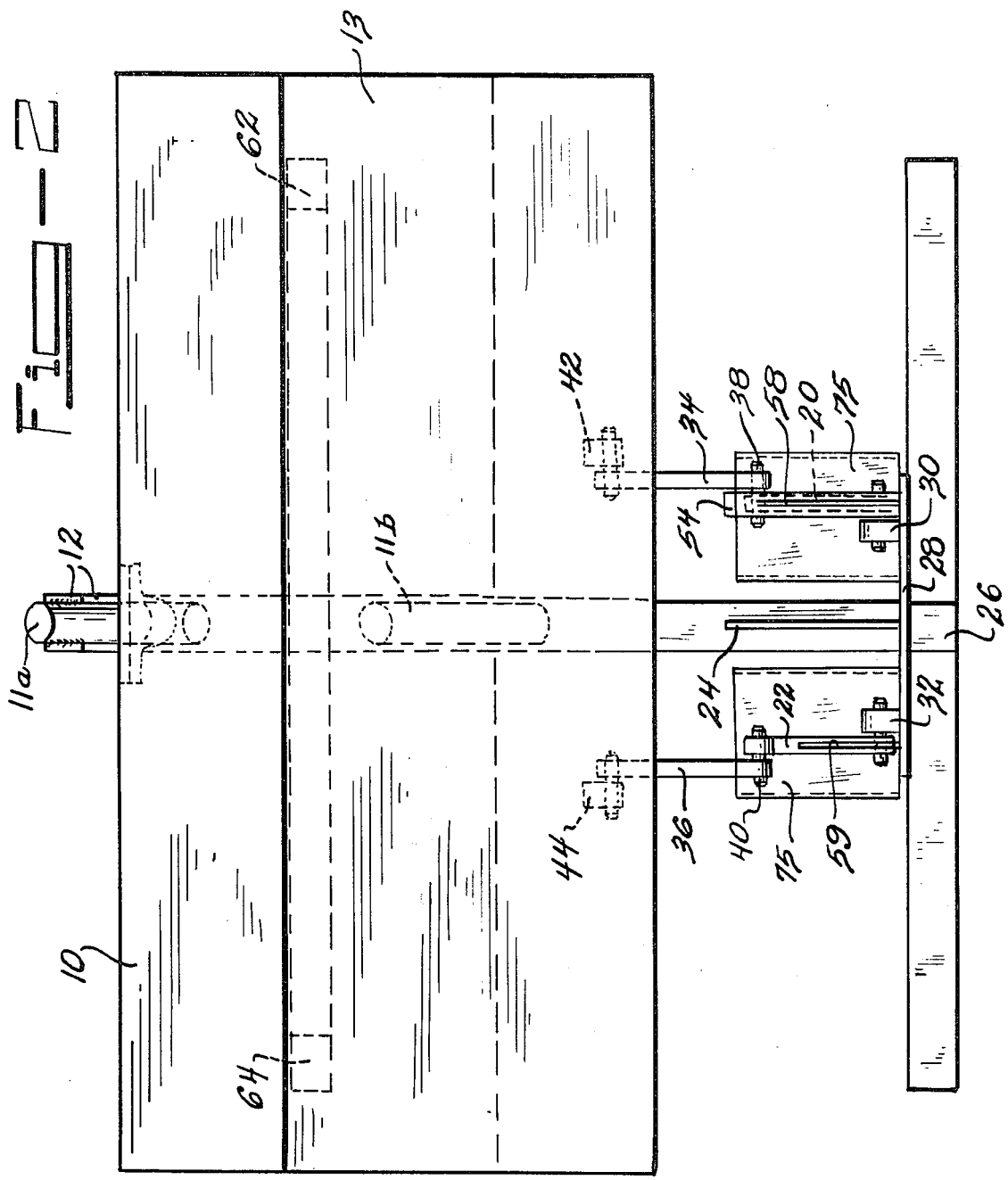

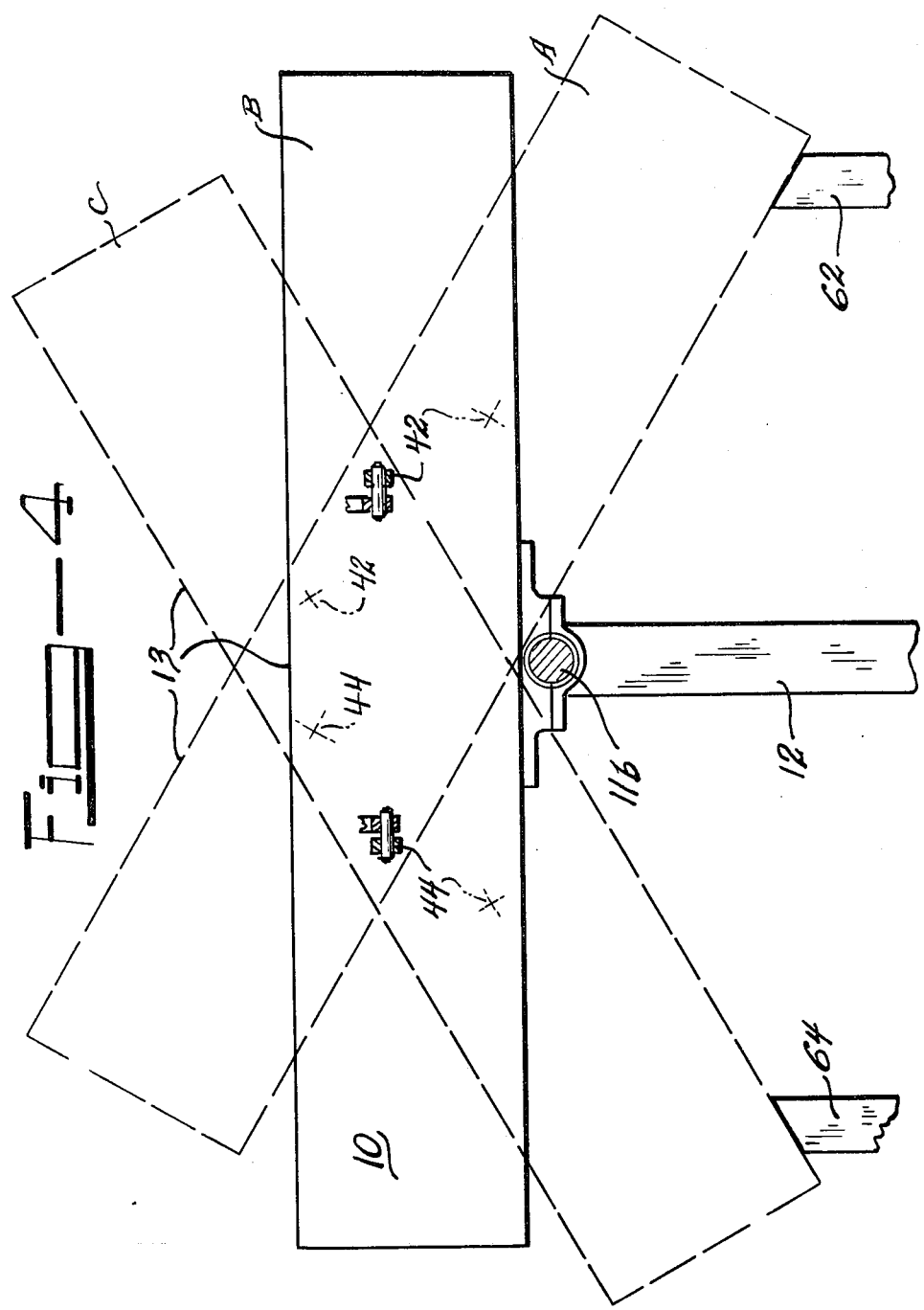

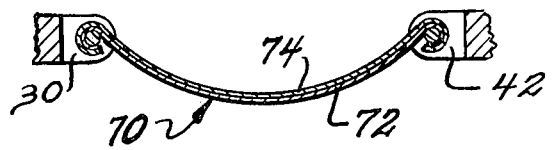
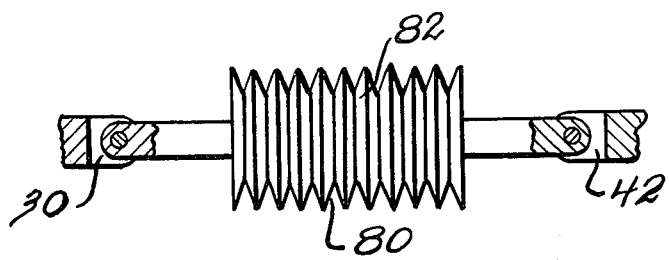
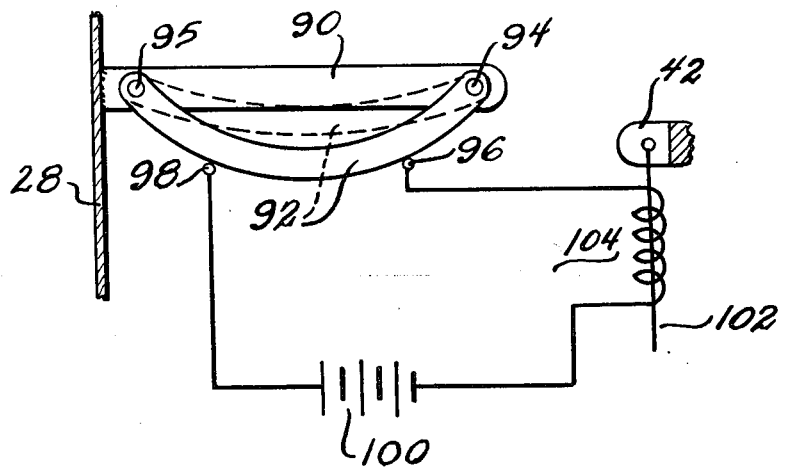

TURNING COLLECTORS FOR SOLAR RADIATION

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The over-all efficiency of the collection of radiant energy from the sun is, among other things, governed by the amount of energy actually collected compared with the energy and expense required for tracking of the sun as it rises and sets each day. With a stationary energy absorber, this is one which generally is positioned to receive maximum radiation at noon and is not provided with any scheme for tracking the sun, maximum solar energy collection is sacrificed to avoid the expense and energy of a tracking scheme. On the other hand, energy absorbers such as heliostatic devices, which are provided with mechanical means for following the sun, usually timed motor-driven means, have increased solar collection but suffer from greater expense in turning of the collector. This increased expense of prior art tracking means is particularly prohibitive where small individual units are desirable, such as in undeveloped countries. In a household use or in such disadvantaged areas of the world, simple durable collectors are necessary.

It is therefore an object of this invention to provide an improved solar collector.

Another object of this invention is to provide an improved means for turning a solar collector to essentially track the sun each day.

SUMMARY OF THE INVENTION

Means are provided for turning a solar collector so that it is generally turned towards the sun as the sun travels from east to west each day. The collector is mounted on an axle coplanar with the earth's polar axis. A shadow plate is also coplanar with the polar axis and has heat-expansive elements coupled to the collector on either side of the shadow plate. In the morning, the east element is heated by the sun and expands, forcing the collector to rotate about the axle in an eastward direction, while the west element is shaded by the plate. At noon, east and west elements are equally heated by the sun and the collector is centered. In the afternoon, the west element is heated by the sun and expands, forcing the collector to rotate about the axle in a westward direction, while the east element is shaded by the plate.

DESCRIPTION OF THE DRAWINGS

FIG. 2 is a top view of the turning solar collector,

FIG. 4 is a partial view taken along line 4—4 of FIG. 1 showing the positions of the collector as it is turned, FIGS. 9 through 11 are alternative embodiments of heat expansive elements.

DETAILED DESCRIPTION

Referring to FIGS. 1 through 4, there is shown a simple, durable mechanism for turning a solar collector to follow the sun each day, which is a compromise between heliostatic and stationary collectors by roughly tracking the sun in a stepwise manner having only few positions. The collector 10 is mounted on axles 11a and 11b which are supported by frame 12. The solar collector, which is a device which absorbs and sometimes concentrates energy received at its frontal face 13, is mounted on axles 11a and 11b so that it is capable of rotating about axles 11a and 11b. The axles should be positioned so that their geometrical axis passes as close to the center of gravity of collector 10 to make it easier to turn the collector 10 about the axles.

The positioning of the axles with respect to the earth's polar axis should allow generally for the rotation of the collector about the polar axis from east to west and from west to east. Thus, the axles 11a and 11b should be generally coplanar with the earth's polar axis. In addition, the ideal orientation of axles 11a and 11b with respect to the polar axis should be normal to the direction of noontime solar radiation. Whether this ideal orientation with respect to the polar axis is achieved is determined by the collector design and the angle that the axles make with the polar axis. Some collectors are fixed constantly parallel to the polar axis, some allow for changing orientation only twice a year, and some provide more frequent changing of this angle.

Figure 1:
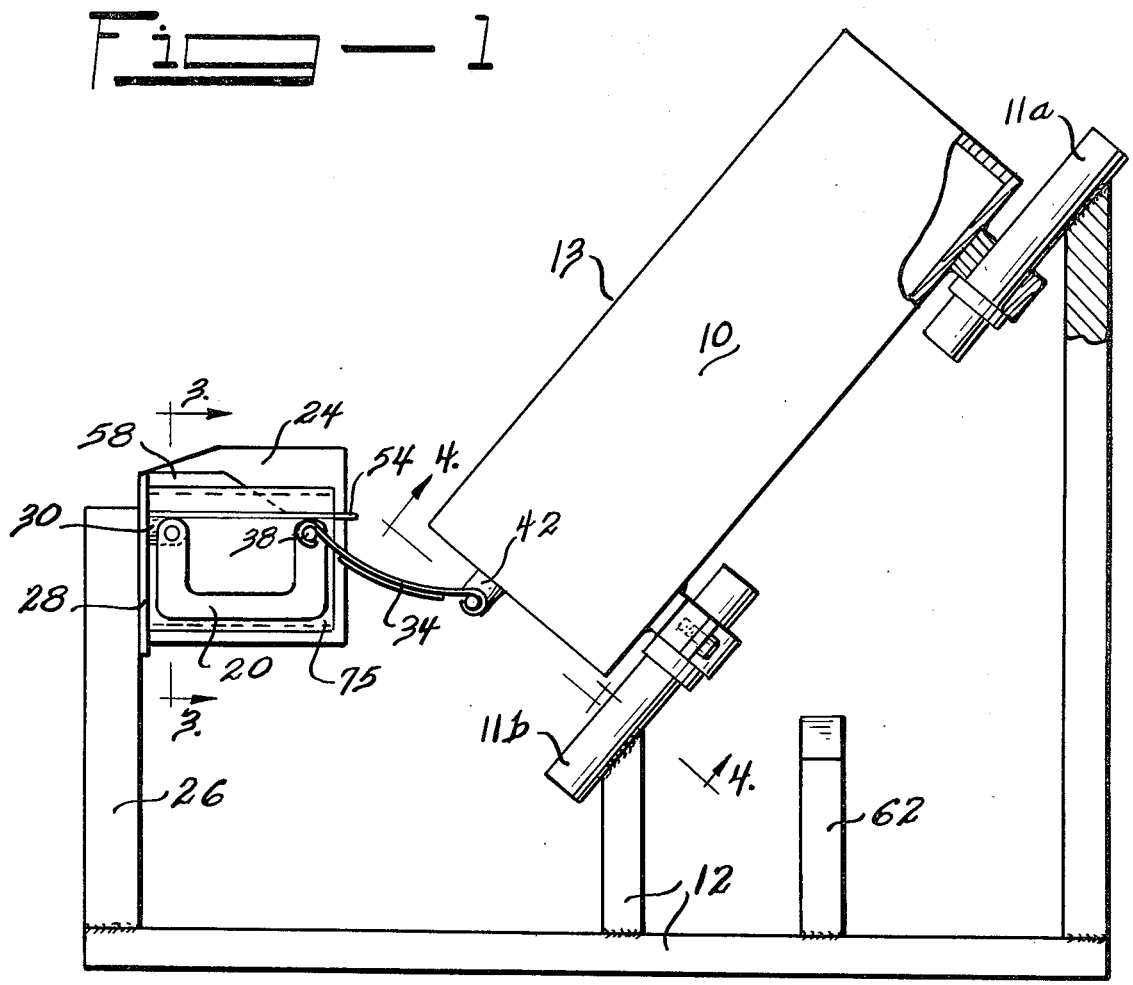
FIG. 1 is a side view of the turning solar collector.
Figure 3:
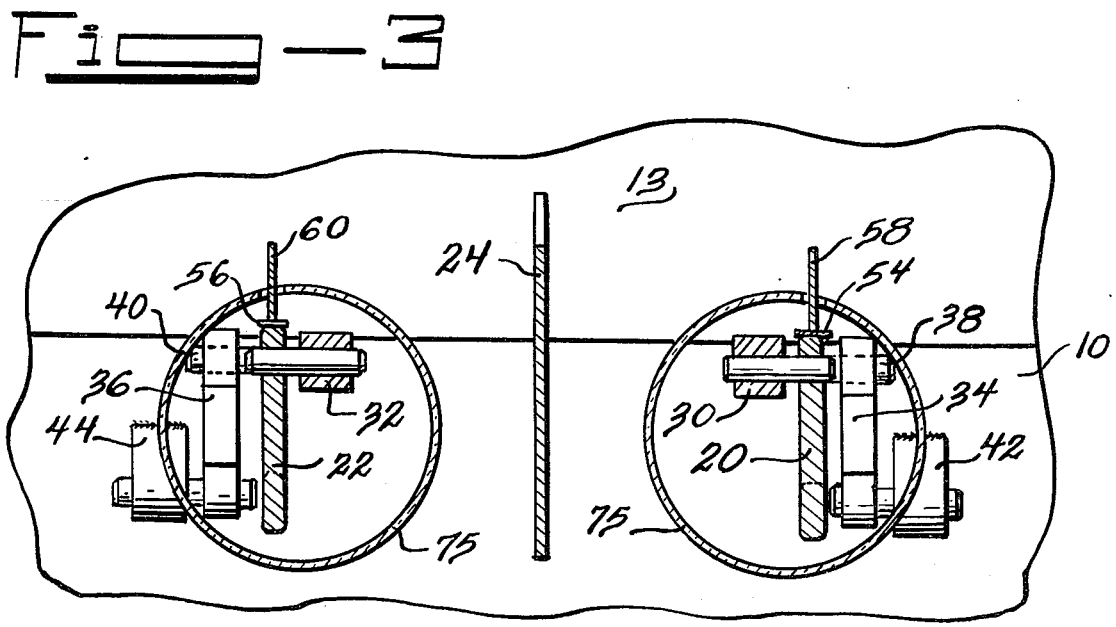
FIG. 3 is a partial view taken along line 3—3 of FIG. 1 of the turning mechanism.
Figure 5:
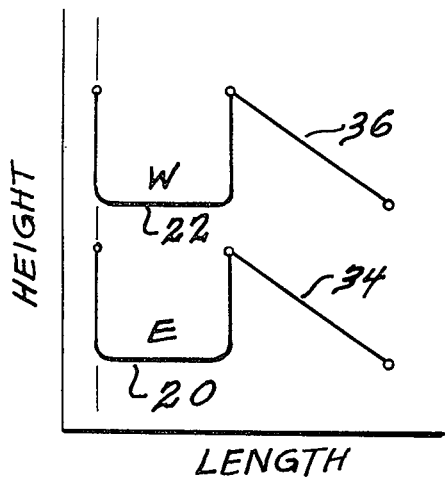
FIGS. 5 through 8 are graphs showing the various positions of the heat-expanding elements of the device.

The invention provides a mechanical means for rotating collector 10 about axles 11a and 11b which in a simplified manner approximates diurnal tracking so that collector 10 will rotate about the axles over an arc approximating the path of the sun. As shown in FIGS. 1 through 3, mechanical means including two heat-expansive metallic element 20, 22 are positioned on either side of a shadow plate 24. Each heat-expansive metallic element 20 and 22 is made of materials which, when heated, expand in size. They may be composed of a single metal which expands sufficiently for the purposes of this device or they may be of a bimetallic structure having regions of differential expansion. In any event, the elements 20 and 22 are positioned on either side of shadow plate 24. Shadow plate 24 is positioned within the plane containing the polar axis and the axles 11a and 11b, such as by being fixed to rigid post 26 of frame 12.

As will be described, the principles of this invention are not limited to heat-expansive metals but are applicable in general to heat-expansive materials. The principle involved is the combination of the property of a material to expand when heated and the utilization of this principle to turn a solar collector to follow the sun from east to west. Further, the particular orientation of the heat-expansive elements and the shadow plate is not limited to that shown in FIGS. 1 through 4. There could be provided more than one plate at different orientations with respect to the position of shadow plate 24. The number of plates and their orientation are matters of design choice.

In the embodiment shown, each element 20 and 22 is coupled to fixed plate 28 mounted on post 26. The coupling between each element 20 and 22 and plate 28 is by pivot connections 30 and 32 which allow for rotation of the elements 20 and 22 about connections 30 and 32, respectively. Connection elements 34 and 36 are coupled to elements 20 and 22 by pivot connections 38 and 40, respectively, and are coupled to collector 10 by pivot connections 42 and 44, respectively. In this embodiment, elements 34 and 36 are flexible, such as by being in the form of leaf springs. The springs may be prestressed so that in the evening position, as will be described, expansion is resisted and contraction is permitted. Rotation of elements 20 and 22 and connection elements 38 and 40 is limited by limiting plates 54 and 56, respectively, which are supported by braces 58 and 60, respectively. In FIG. 2, elements 58 and 60 are not shown on the left side to show slot 59 in shield 75. Slot 59 allows assembly of the device within shield 75. Note that there is symmetry of elements on either side of shadow plate 24.

Figure 7:
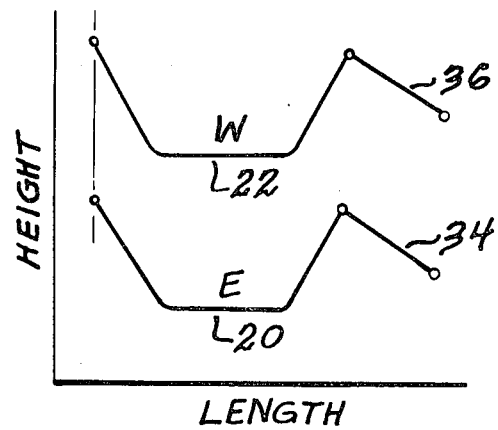
Figure 6:
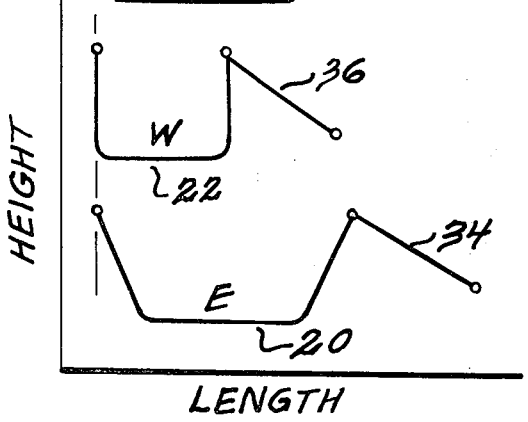
Figure 8:
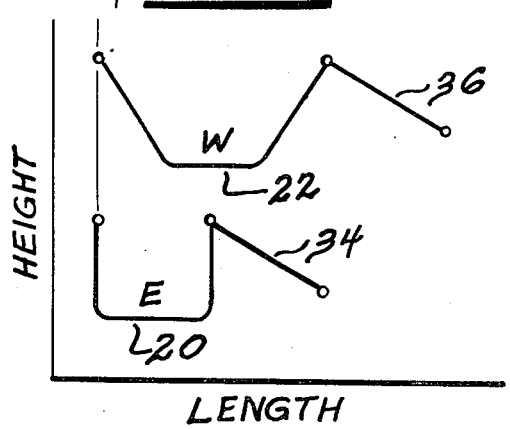

Operation of the device is better understood with reference to FIGS. 5 through 8, which illustrate the relative expansive conditions of elements 20 and 22 and elements 34 and 36, and FIG. 4, which shows the rotation of collector 10 about the axles to follow the sun. At night, the elements 20 and 22 are cold. Since the system is symmetric, collector 10 is symmetric with respect to the plane of the polar axis and axles 11a and 11b, as shown by position B in FIG. 4 and by the relative positions shown in FIG. 5. In the morning, the shadow of shadow plate 24 covers the western element 22, while the eastern element 20 is radiated by the sun. The element 20 heats up and expands, while element 22 remains cold and in its cold shrunk position. The eastern element 20 thus pushes the eastern side of collector 10 around axles 11a and 11b toward the east, increasing the projection of the collector's thermal area normal to the sun's rays. The relative morning positions of the elements is illustrated in FIG. 6 and the collector is in position A of FIG. 4. In the late morning, say between 10:00 AM and 11:00 AM, the shadow of plate 24 begins to fall off the western element 22, which then begins to heat up and expand. As it expands, element 22 begins to push collector 10 back to its evening position. At noon, collector 10 returns to its evening position B with the condition of the elements as shown in FIG. 7. Past noon, the shadow from plate 24 begins to fall on element 20 which begins to cool and shrink, allowing the collector 10 to be pushed towards the west about axles 11a and 11b, with the position of the elements illustrated in FIG. 8 and with the position of collector 10 shown by C of FIG. 4.

The noon condition illustrated in FIG. 7 assumes that the elements 20 and 22 are not shaded by limiting plates 54 and 56. If no shading by plates 54 and 56 is desired, then plates 54 and 56 may be of a transparent material or they may be so shaped such as by being in an L shape to allow for radiation of elements 20 and 22 by the sun at noon. However, it may be desirable to allow plates 54 and 56 to shade their respective heat-expansive elements at noon so that FIG. 5 would correspond to the noon condition and plates 54 and 56 would be opaque.

The amount of turning is determined by the design geometry of the system, such as the amount of expansion of the elements, the distance from the pivot connections to the axles 11a and 11b, and the length of elements 20, 22, 34 and 36. Additional limitation on rotation may be provided by stop posts 62 and 64.

It is necessary to provide means for contraction of the linking elements on the side of the collector opposite from the direction in which the collector is turning. Where the heat-expansive elements 20 and 22 are not inherently flexible, this is provided by elements 34 and 36 being springs such as leaf springs. An example of a material which could be used in the embodiment shown in FIG. 1 through FIG. 4 is an equiatomic nickel-titanium metallic alloy called Nitinol, a memory alloy. U-shaped Nitinol elements 20 and 22, 4 inches across, will expand on the order of 1 inch with the change in temperature normally occurring between night and day. This is sufficient with appropriate design geometry to give 30° of movement for collector 10 on either side of the plane of the polar axis.

When the heat-expansive element is sufficiently flexible in and of itself, elements 34 and 36 can be eliminated. FIG. 9 shows a configuration, using a bimetallic heat-expansive element 70 coupled between the pivot connections 30 and 42 of FIGS. 1 through 4. Member 74 is more expansive when heated than member 72. Members 72 and 74 are bonded together such as by pivoting so that when element 70 is heated, member 74 expands more than member 72, tending to flatten out element 70. An element 70 of FIG. 9 is positioned on either side of shadow plate 24 and replaces elements 20 and 22 and 34 and 36 of FIGS. 1 through 4. When element 70 is radiated by the sun, it expands, tending to turn collector 10. The necessary contraction of the nonradiated element results from the inherent flexibility of element 70. Such an element may be composed of steel for member 72 and aluminum, lead or zinc for member 74.

Another embodiment of a heat-expansive element may be substituted for elements 20 and 22 as shown in FIG. 10. Here element 80 includes a bellows spring 82 which contains a highly heat-expansive gas or vapor-liquid mixture. When heat is applied to the fluid in bellows 82, it expands or evaporates, tending to open bellows 82. When heat is removed, the fluid contracts or condenses, allowing contraction of bellows 82. An element 80 of FIG. 10 may be positioned on either side of shadow plate 24 and replaces elements 20 and 22 and 34 and 36 of FIG. 1 through FIG. 4. The bellows construction and the cooling of the gas provides the necessary contraction for the nonradiated element. The selection of the proper gas is determined by the climate. For climates which have average temperatures during daytime of 75° or more, Freon 11 (trichloromonofluoromethane) would be suitable.

Another embodiment utilizing a heat-expansive element is illustrated in FIG. 11 which is an electromechanical device. This embodiment utilizes a bimetallic element composed of a less heat-expansive element 90 and a more heat-expansive element 92. Element 92 is coupled by pivots 94 and 95 in a bowed form to element 90 which is rigidly mounted on plate 28. When elements 90 and 92 are heated, element 92 expands more, moving from the position indicated by the dashed lines to the position indicated by solid lines and makes an electrical contact between contacts 96 and 98. This completes a circuit formed by battery 100 and solenoid 104. When energized, the core 102 of solenoid 104 drives against pivot 42 mounted on the collector, tending to turn the collector. Flexibility is provided since the non-energized solenoid offers no resistance to motion of its coil. An element illustrated in FIG. 11 is mounted on plate 28 on either side of shadow plate 24 of FIGS. 1 through 4, replacing pivots 30, 32, and elements 20 and 22 and 34 and 36. Such a scheme would move in steps.

To minimize atmospheric interruptions by variable air temperatures and wind effects on the expansive elements, a transparent heat shield 75 may be included to surround the elements, as shown in FIGS. 1 through 3. The effect of the heat shield is similar to that of a greenhouse effect and insures a continuous heat buildup and dissipation in the heat-expansive elements. Each shield is provided with a slot 59 to simplify assembly.

The embodiments of the invention in which an exclusive property or privilege is claimed are defined as follows:

1. A device for turning a solar energy collector about the polar axis between at least two positions so that the frontal face of the collector at each position is directed approximately towards the sun as the sun tracks from east to west each day, comprising:

axle means upon which the collector is mounted free to rotate thereabout with the frontal face directed skyward, said axle means being aligned coplanar with the earth's polar axis so that rotation of the collector thereabout is in an east-west direction, a frame, a first heat responsive element which with solar radiation incident thereupon assumes a first stable state, and fixed shadow means for shading said first element from the sun's radiant energy during a first period of the daylight hours and for allowing the sun's radiant energy to be incident upon said first element during a second period of the daylight hours, said first element being responsive to being shaded by said shadow means to assume a second stable state, said first element being so coupled to the collector and said frame that in response to said first element being in said first state due to being radiated by said sun during said second period, the collector is rotated about said axle means to assume a first position whereby the collector's frontal face is approximately directed towards the sun during said second period, and that in response to said first element being in said second state due to being shaded from the sun by said shadow means during said first period the collector is rotated about said axle means to assume a second position whereby the collector's frontal face is approximately directed towards the sun during said first period.

2. The device of claim 1 further including a second heat expansive element which with solar radiation incident thereupon assumes a first stable state, said second element being coupled to said frame and said collector and being so positioned with respect to said fixed shadow means that said shadow means shades said second element from the sun's radiant energy during said second period of the daylight hours and allows the sun's radiant energy to be incident upon said second element during said first period of the daylight hours and allows equal radiation of said elements during a third period of the daylight hours, said second element being responsive to being shaded by said show means to assume a second stable state, in response to said second element being in said first state without said first element in said first state, the collector is rotated about said axle means to assume a second position whereby the collectors frontal face is approximately directed towards the sun during said first period, and in response to said first and second elements being equally radiated during said third period, the collector is rotated about said axle means to assume a third position whereby the collectors frontal face is approximately directed towards the sun during said third period.

3. The device of claim 2 wherein said shadow means includes a shadow plate coplanar with said axle means and the earth's polar axis, and wherein said first and second elements are positioned symmetrically on either side of said shadow plate.

4. The device of claim 2 wherein each heat-expansive element includes a spring so that with expansion of one element rotation of the absorber in response thereto is permitted by the flexibility of the spring of the other element.

5. The device of claim 2 further including a heat shield surrounding each of said elements for preventing dissipation of solar radiation incident on said elements.

6. The device of claim 2 wherein each of said expansive elements includes a metal element which with radiant energy incident thereto expands.

7. The device of claim 6 wherein said metal element is of Nitinol.

8. The device of claim 6 wherein said metal element is a bimetal having regions of differential heat expansion.

9. The device of claim 8 wherein said bimetal is composed of regions of steel and zinc.

10. The device of claim 2 wherein each of said heat-expansive elements includes a bellows filled with a heat-expansive gas.

11. The device of claim 10 wherein said gas is Freon-11.

12. The device of claim 2 wherein each of said heat-expansive elements includes a bimetallic element which with sufficient solar radiation incident thereupon moves from a first position to a second position, two electrical contacts positioned so that with said bimetallic element in said second position an electrical contact is made between said electrical contacts, a battery, and a solenoid whose core is coupled to the absorber, said battery and said solenoid being coupled in series with said electrical contacts so that with said bimetallic element in said second position said solenoid is energized and said core causes the absorber to rotate in the desired direction.

* * * * *